United States Patent
Zhuang et al.

(10) Patent No.: US 9,715,486 B2
(45) Date of Patent: Jul. 25, 2017

(54) ANNOTATION PROBABILITY DISTRIBUTION BASED ON A FACTOR GRAPH

(71) Applicant: LinkedIn Corporation, Mountain View, CA (US)

(72) Inventors: Honglei Zhuang, Urbana, IL (US); Joel D. Young, Milpitas, CA (US)

(73) Assignee: LinkedIn Corporation, Sunnyvale, CA (US)

(*) Notice: Subject to any disclaimer, the term of this patent is extended or adjusted under 35 U.S.C. 154(b) by 213 days.

(21) Appl. No.: 14/502,319

(22) Filed: Sep. 30, 2014

(65) Prior Publication Data

US 2016/0042290 A1 Feb. 11, 2016

Related U.S. Application Data

(60) Provisional application No. 62/033,418, filed on Aug. 5, 2014.

(51) Int. Cl.
*G06F 17/00* (2006.01)
*G06F 17/24* (2006.01)
(Continued)

(52) U.S. Cl.
CPC .......... *G06F 17/241* (2013.01); *G06F 17/16* (2013.01); *G06F 17/30598* (2013.01);
(Continued)

(58) Field of Classification Search
CPC .............. G06F 17/16; G06F 17/30598; G06F 17/30864
See application file for complete search history.

(56) References Cited

U.S. PATENT DOCUMENTS

2002/0168664 A1* 11/2002 Murray ................. G06F 19/28
435/6.14
2004/0264780 A1* 12/2004 Zhang ............... G06F 17/30265
382/224
(Continued)

OTHER PUBLICATIONS

Klaus Brinker. Incorporating diversity in active learning with support vector machines. In ICML, vol. 3, pp. 59-66, 2003.
(Continued)

*Primary Examiner* — Stephen Hong
*Assistant Examiner* — Gregory Vaughn
(74) *Attorney, Agent, or Firm* — Park, Vaughan, Fleming & Dowler LLP

(57) ABSTRACT

In order to address annotation bias in batch annotations, obtained via crowdsourcing, on a set of comments on user posts in a social network, a system determines an annotation probability distribution based on a factor-graph model of the batch annotations. In particular, during operation the system computes the factor-graph model that represents relationships between feature vectors that represent the comments and the annotations for the comments. Note that, for a given batch of k comments, the factor-graph model may include a statistically dependent combination of statistically independent models of the interrelationships between the feature vectors and the annotations for the k comments. Then, the system calculates the annotation probability distribution based on model parameters associated with the factor-graph model, a mapping function that maps from the feature vectors to the annotations, and an indicator function that represents the annotations for the comments in the batches.

20 Claims, 7 Drawing Sheets

(51) Int. Cl.
 G06F 17/16 (2006.01)
 G06F 17/30 (2006.01)
 G06N 7/00 (2006.01)
 G06N 99/00 (2010.01)
 G06Q 50/00 (2012.01)
 G06K 9/62 (2006.01)

(52) U.S. Cl.
 CPC ..... *G06F 17/30864* (2013.01); *G06K 9/6277* (2013.01); *G06N 7/005* (2013.01); *G06N 99/005* (2013.01); *G06Q 50/01* (2013.01)

(56) References Cited

U.S. PATENT DOCUMENTS

| | | | | |
|---|---|---|---|---|
| 2008/0147574 | A1* | 6/2008 | Chidlovskii | G06N 99/005 706/12 |
| 2009/0157572 | A1* | 6/2009 | Chidlovskii | G06N 99/005 706/12 |
| 2011/0040760 | A1* | 2/2011 | Fleischman | G06Q 30/02 707/737 |
| 2012/0039527 | A1* | 2/2012 | Qi | G06K 9/4676 382/159 |
| 2012/0304008 | A1* | 11/2012 | Hackstein | G05B 23/024 714/26 |
| 2013/0318099 | A1 | 11/2013 | Sano | |
| 2014/0143251 | A1* | 5/2014 | Wang | G06F 17/30598 707/737 |
| 2014/0172989 | A1 | 6/2014 | Rubinstein | |
| 2014/0280145 | A1* | 9/2014 | Heit | G06F 17/30598 707/737 |
| 2015/0089399 | A1 | 3/2015 | Megill | |
| 2015/0142707 | A1* | 5/2015 | Charif | G06N 99/005 706/12 |
| 2016/0088063 | A1 | 3/2016 | Cahn | |

OTHER PUBLICATIONS

B. Carterette and I. Soboroff. The effect of assessor error on it system evaluation. In SIGIR, pp. 539-546. ACM, 2010.
R. Chattopadhyay, Z. Wang, W. Fan, I. Davidson, S. Panchanathan, and J. Ye. Batch mode active sampling based on marginal probability distribution matching. In KDD, pp. 741-749. ACM, 2012.
T. Cohn and L. Specia. Modelling annotator bias with multi-task gaussian processes: An application to machine translation quality estimation. In ACL, pp. 32-42, 2013.
A. Das, S. Gollapudia, R. Panigrahy, and M. Salek. Debiasing social wisdom. In KDD, pp. 500-508. ACM, 2013.
T. Demeester, R. Aly, D. Hiemstra, D. Nguyen, D. Trieschnigg, and C. Develder. Exploiting user disagreement for web search evaluation: an experimental approach. In WSDM, pp. 33-42. ACM, 2014.
P. Donmez, J. G. Carbonell, and J. Schneider. Efficiently learning the accuracy of labeling sources for selective sampling. In KDD, pp. 259-268. ACM, 2009.
R. G. Gomes, P. Welinder, A. Krause, and P. Perona. Crowdclustering. In NIPS, pp. 558-566, 2011.
Y. Guo and D. Schuurmans. Discriminative batch mode active learning. In NIPS, pp. 593-600, 2008.
S. C. Hoi, R. Jin, and M. R. Lyu. Large-scale text categorization by batch mode active learning. In WWW, pp. 633-642. ACM, 2006.
S. C. Hoi R. Jin, J. Zhu, and M. R. Lyu. Batch mode active learning and its application to medical image classifcation. In ICML, pp. 417-424. ACM, 2006.
V. C. Raykar and S. Yu. Ranking annotators for crowdsourced labeling tasks. In NIPS, pp. 1809-1817, 2011.
V. C. Raykar, S. Yu, L. H. Zhao, A. Jerebko, C. Florin, G. H. Valadez, L. Bogoni, and L. Moy. Supervised learning from multiple experts: whom to trust when everyone lies a bit. In ICML, pp. 889-896. ACM, 2009.
V. C. Raykar, S. Yu, L. H. Zhao, G. H. Valadez, C. Florin, L. Bogoni, and L. Moy. Learning from crowds. JMLR, 11:1297-1322, 2010.
F. Scholer, A. Turpin, and M. Sanderson. Quantifying test collection quality based on the consistency of relevance judgements. In SIGIR, pp. 1063-1072. ACM, 2011.
V. S. Sheng, F. Provost, and P. G. Ipeirotis. Get another label? improving data quality and data mining using multiple, noisy labelers. In KDD, pp. 614-622. ACM, 2008.
R. Snow, B. B O'Connor, D. Jurafsky and A. Y. NG. Cheap and fast|but is it good?: evaluating non-expert annotations for natural language tasks. In EMNLP, pp. 254-263, 2008.
S. Vijayanarasimhan and K. Grauman. Large-scale live active learning: Training object detectors with crawled data and crowds. In CVPR, pp. 1449-1456. IEEE, 2011.
Z. Wang and J. Ye. Querying discriminative and representative samples for batch mode active learning. In KDD, pp. 158-166. ACM, 2013.
F. L. Wauthier and M. I. Jordan. Bayesian bias mitigation for crowdsourcing. In NIPS, pp. 1800-1808, 2011.
P. Welinder, S. Branson, P. Perona, and S. J. Belongie. The multidimensional wisdom of crowds. In NIPS, pp. 2424-2432, 2010.
J. Whitehill, T.-F. Wu, J. Bergsma, J. R. Movellan, and P. L. Ruvolo. Whose vote should count more: Optimal integration of labels from labelers of unknown expertise. In NIPS, pp. 2035-2043, 2009.
Y. Yan, G. M. Fung, R. Rosales, and J. G. DY. Active learning from crowds. In ICML, pp. 1161-1168, 2011.
K. Yu, J. Bi, and V. Tresp. Active learning via transductive experimental design. In ICML, pp. 1081-1088. ACM, 2006.

\* cited by examiner

ANNOTATION PROBABILITY DISTRIBUTION BASED ON A FACTOR GRAPH

CROSS-REFERENCE TO RELATED APPLICATION

This application claims priority under 35 U.S.C. §119(e) to U.S. Provisional Application Ser. No. 62/033,418, entitled "Leveraging In-Batch Annotation Bias for Crowdsourced Active Learning," by Honglei Zhuang and Joel Young, filed on Aug. 5, 2014, the contents of which are herein incorporated by reference.

This application is related to U.S. Non-provisional Application Ser. No. 14/501,938, entitled "Leveraging Annotation Bias to Improve Annotations," by Honglei Zhuang and Joel Young, filed on Sep. 30, 2014, the content of which is herein incorporated by reference.

BACKGROUND

Field

The described embodiments relate to techniques for determining an annotation probability distribution. More specifically, the described embodiments relate to techniques for determining an annotation probability distribution based on a factor-graph model of annotations provided by reviewers.

Related Art

Online crowdsourcing platforms are increasingly popular ways to leverage Internet users across the world to provide a scalable technique for annotating datasets for various machine learning tasks. Although these crowdsourcing platforms are less expensive than employing and training expert annotators, crowdsourcing can still be expensive because building a high-performance classifiers often requires large sets of annotated data with multiple annotations for each data item.

One approach for addressing this problem is active learning, in which a particular unlabeled data instance is selected for labeling in an attempt to improve the classifier performance. However, traditional active-learning techniques often assume reliable annotators. This assumption is usually not valid with crowdsourcing. In addition to the annotation bias for each individual annotator, there can be interference between data items simultaneously presented for annotation through crowdsourcing. For example, there are often situations in which batches of multiple data items are judged by crowds at the same time. In particular, when evaluating results of a search engine given a certain query, the retrieved web pages are usually judged by crowds (either by explicit labeling or implicit click through rate) in batches. Other examples include object recognition and clustering. In general, batch active learning may be particularly vulnerable as multiple data items are submitted simultaneously for annotation, both to reduce annotation costs and to minimize classifier retraining cycles. The resulting annotation bias can degrade the quality of services based on the annotated data, which can be frustrating to users of these services.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a system that provides comments on user posts (and, more generally, a group of documents) in a social network for batch annotation via crowdsourcing are described. The system uses the batch annotations to train a supervised-learning model or classifier that predicts how accurate the annotations are for the comments, which can be used to filter the comments (such as removing inappropriate or offensive comments). In order to address annotation bias in the annotations (and, thus, to reduce errors in the classifier), this system determines an annotation probability distribution based on a factor-graph model of the batch annotations. Then, the annotation bias specified by the annotation probability distribution is used to select a set of comments provided to the annotators or reviewers to include comments that are useful and/or that are likely to be answered correctly (and to mask or exclude those comments that are not useful and/or that are not likely to be answered correctly). In particular, the set of comments may include those comments that are likely to occur based on the factor-graph model and that are informative to the classifier (e.g., the comments that are likely to give expected results and, thus, are easier to use in training the classifier).

In these ways, the system may leverage the annotation bias to obtain information (the batch annotations) via crowdsourcing that results in a classifier that more accurately predicts annotations on the comments on the user posts (and, more generally, the group of documents) in the social network. These predicted annotations may be used to filter the comments and, more generally, to improve the quality of the content on the social network. Consequently, this annotation technique may improve: the user experience when using the social network, user satisfaction and retention, the value of the social network, and/or the revenue and profitability of a provider or host of social network and/or the system.

In the discussion that follows, an individual or a user may include a person (for example, an existing user of the social network or a new user of the social network). Also, or instead, the annotation technique may be used by an organization, a business, and/or a government agency. Furthermore, a 'business' should be understood to include for-profit corporations, non-profit corporations, groups (or cohorts) of individuals, sole proprietorships, government agencies, partnerships, etc.

Figure 1:
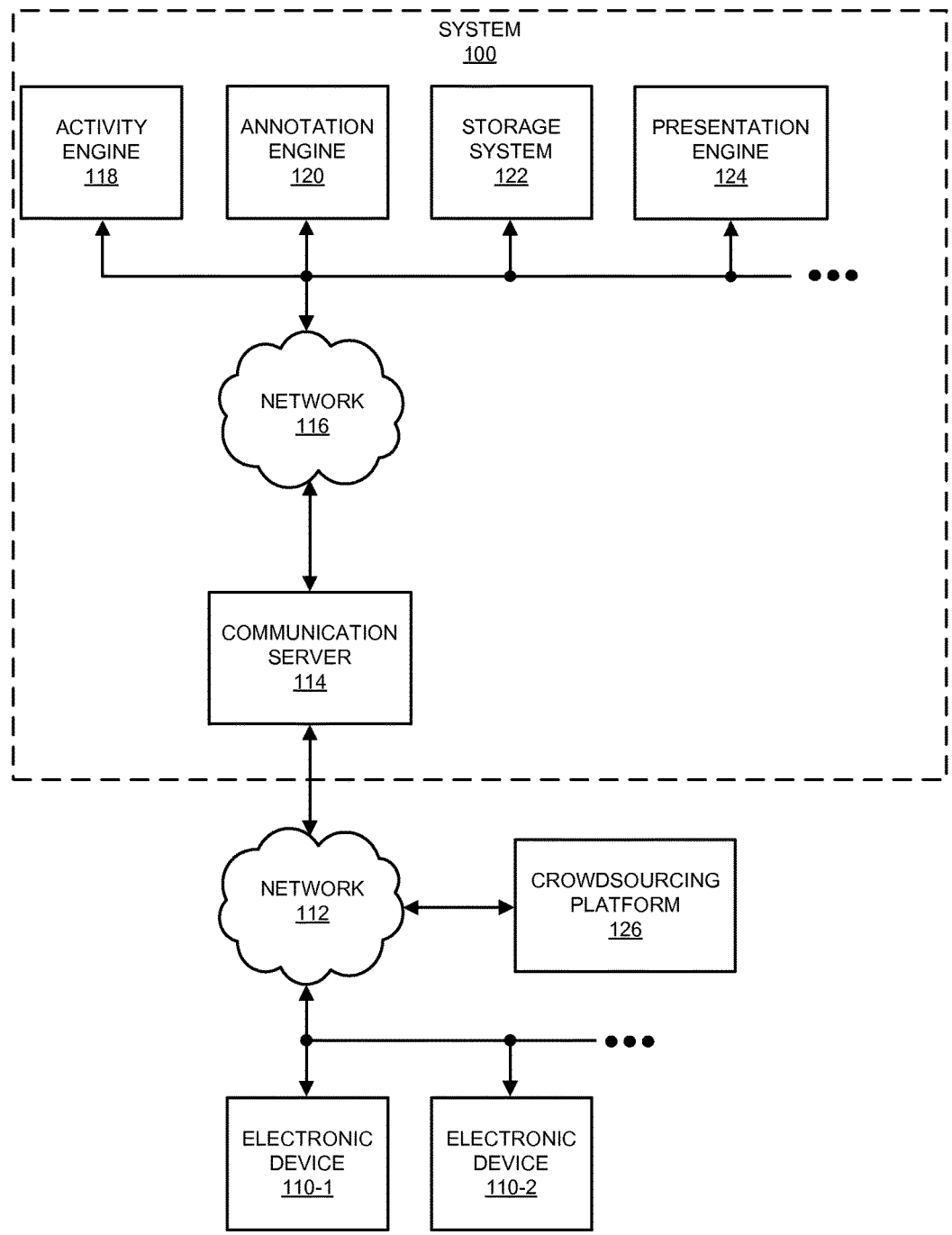
FIG. 1 is a block diagram illustrating a system used to annotate comments on user posts in a social network in accordance with an embodiment of the present disclosure.

We now describe embodiments of the system and its use. FIG. 1 presents a block diagram illustrating a system 100 that performs the annotation technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Using one of electronic devices 110 (such as electronic device 110-1) as an illustrative example, a user of electronic device 110-1 may use the software application to interact with other users in a social network (and, more generally, a network of users), such as a professional social network, that facilitates interactions among the users. Note that each of the users of the software application may have an associated user profile that includes personal and professional characteristics and experiences, which are sometimes collectively referred to as 'attributes.' For example, a user profile may include: demographic information (such as age and gender), geographic location, work industry for a current employer, functional area (e.g., engineering, sales, consulting), seniority in an organization, employer size, education (such as schools attended and degrees earned), employment history (such as previous employers and the current employer), professional development, interest segments, target groups, additional professional attributes, and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections.

In particular, when using the software application, the users may post content or data items in the social network (which is sometimes referred to as 'user posts'), such as: text, pictures, video, documents or files, presentations, etc. In addition, the users may post comments on other users' posts. For example, a user may indicate that they like a user post or may provide feedback about the user post. In general, user posts and/or comments may include: verbal, written, or recorded information. Note that the user posts or comments may be communicated to other users via the software application that executes in the environment of electronic devices 110. Moreover, the users providing the posts may include so-called 'influencers,' who interact with multiple other users in the social network and, therefore, who may be represented by nodes having multiple edges in the social graph.

However, as noted previously, at least some of the comments provided by the users may be inappropriate. For example, some of the comments may include spam, may be offensive, and/or may not include supporting text (such as a comment that only includes an email address or a link to a web page). In order to improve the quality of the content in the social network (and, thus, the user experiences when using the social network), an operator or provider of system 100 may wish to filter the comments to exclude those that are inappropriate, offensive, lacking content or that are otherwise undesirable. As described previously, this may involve system 100 training a classifier using a supervised-learning technique, and using the classifier to filter (and, more generally, modify) the comments.

In particular, over time, via network 116, an activity engine 118 in system 100 may aggregate the user posts and the associated comments. Then, activity engine 118 may store the aggregated information in a data structure, which is stored in a computer-readable memory, such as storage system 122 that may encompass multiple devices, i.e., a large-scale storage system.

Moreover, annotation engine 120 may provide, via network 112, user posts and subsets of the comments to annotators (who are sometimes referred to as 'reviewers') in a crowdsourcing platform 126. For example, annotation engine 120 may provide the user posts and the one or more subsets of the comments to a server associated with and operated on behalf of a provider of crowdsourcing platform 126. This server may provide or present the user posts and the one or more subsets of the comments to the annotators using a client-server architecture, and may receive the annotations from the annotators. Then, the server may provide the annotations to annotation engine 120 in system 100 via network 112. Next, annotation engine 120 may use these annotations and the one or more subsets of the comments to train one or more supervised-learning models or classifiers using the supervised-learning technique, which may be stored in storage system 122. For example, the classifier may be trained to predict annotations for comments using logistic regression with L2 regularization. However, a wide variety of supervised-learning techniques may be used, including regression-type classification techniques such as: classification and regression trees, random forests, support vector machines, LASSO, etc. A given classifier (which may be valid for a specified time interval, such as one day, a week or a month) may be used by annotation engine 120 to predict how accurate the annotations are for the comments. Thus, annotation engine 120 may use the given classifier to filter or modify the comments presented to the users of the social network. For example, annotation engine 120 may use the given classifier to modify flags associated with the comments stored in storage system 122 so that presentation engine 124 only presents those comments with flags that indicate these comments are 'active' (or not excluded) to the users of the social network when the users are viewing associated user posts.

As noted previously, the annotations received from the reviewers in crowdsourcing platform 126 often include errors or biases (which are referred to as 'annotation bias'). For example, approximately 30% of the annotations may be discarded. In addition, the annotations from the same or different reviewers may include correlations that distort their accuracy. In particular, crowdsourcing platforms often present a user post and a sampling of associated comments (such as five comments). The annotations received from the reviewers may depend on how many of these comments were appropriate or inappropriate (such as offensive comments, incomplete comments, spam, etc.).

Figure 4:
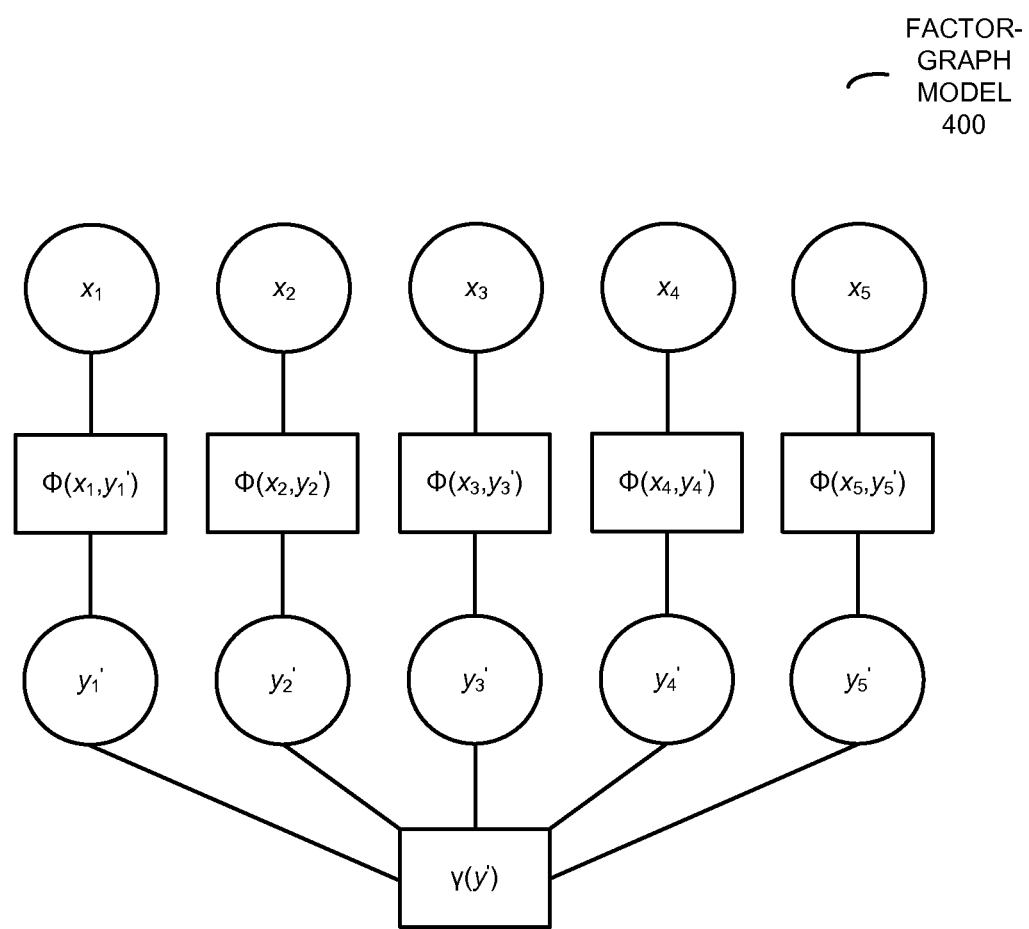
FIG. 4 is a drawing illustrating a factor-graph model of batch annotation in accordance with an embodiment of the present disclosure.
Figure 5:
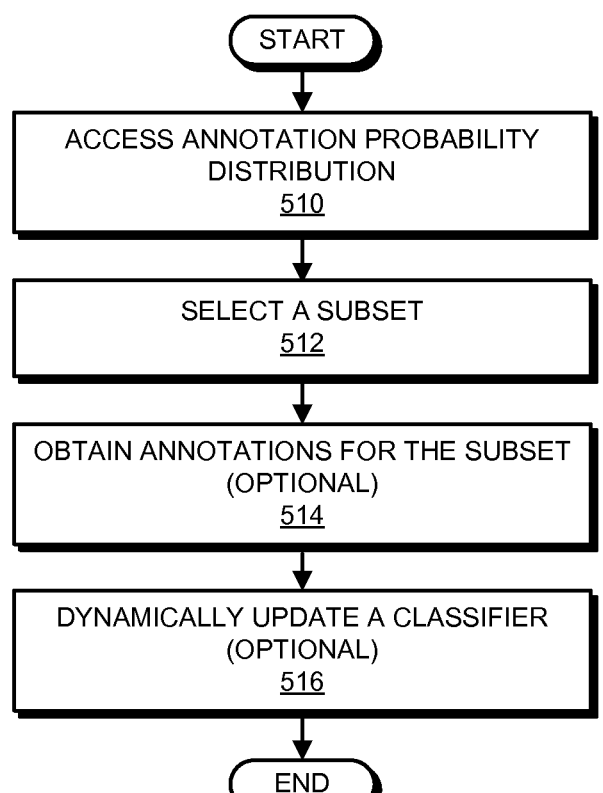
FIG. 5 is a flow chart illustrating a method for selecting a subset of a set of comments associated with a group of documents in accordance with an embodiment of the present disclosure.
Figure 6:
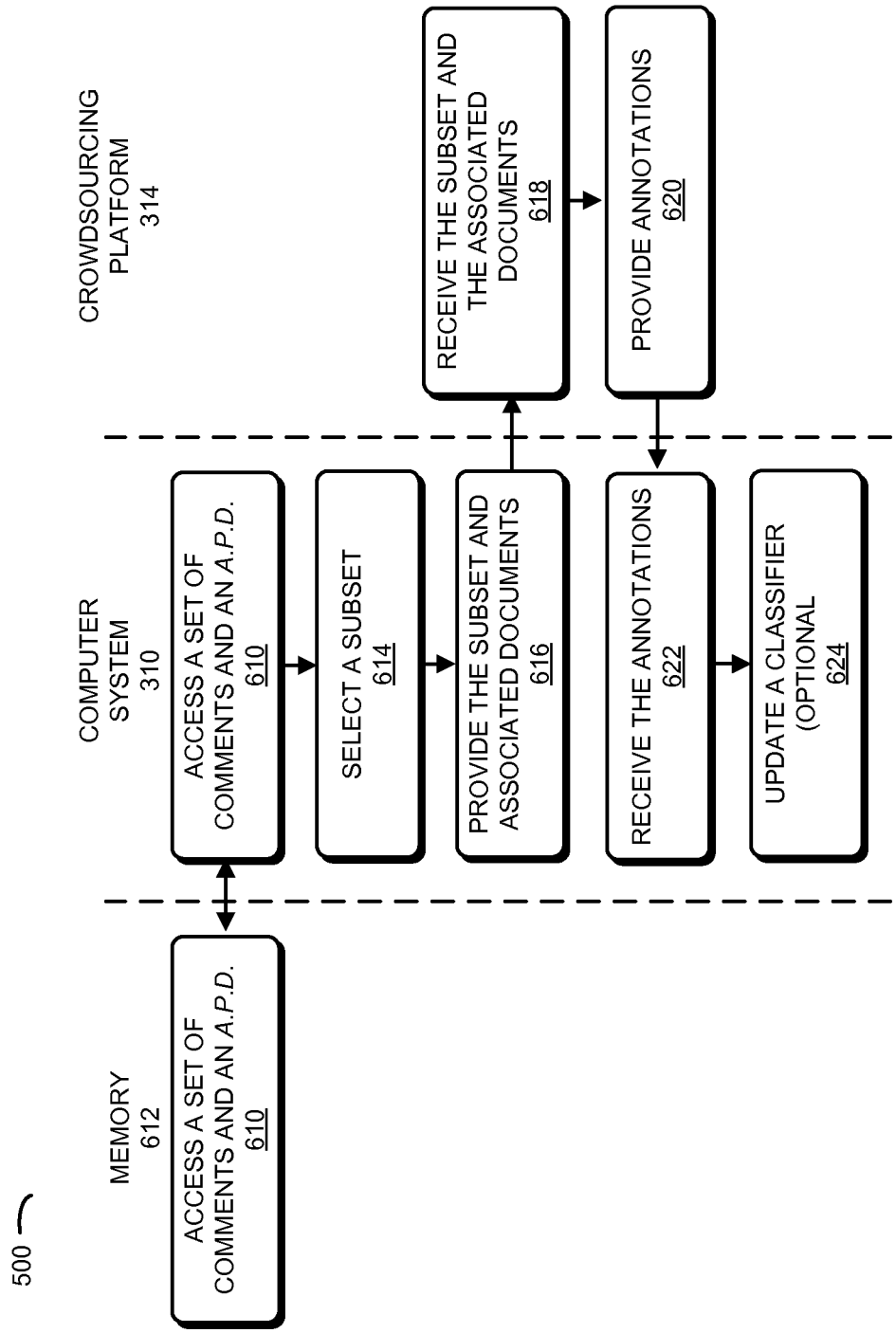
FIG. 6 is a flow chart illustrating the method of FIG. 5 in accordance with an embodiment of the present disclosure.

In order to identify and leverage annotation bias in the annotations (and, thus, to improve the accuracy of the one or more classifiers), annotation engine 120 may use a factor-graph model (which is described further below with reference to FIG. 4) to calculate the annotation probability distribution of the annotations received for one or more subsets of comments (which is described further below with reference to FIGS. 2 and 3), and then may use the annotation probability distribution to select one or more subsequent subsets of comments that are provided (along with the associated user posts) to the annotators (which is described further below with reference to FIGS. 5 and 6). In particular, annotation engine 120 may compute a factor-graph model (which is described further below with reference to FIG. 4) that represents relationships between feature vectors that represent the comments (such as a number of uppercase letters, a number of lowercase letters, text in common with other comments, etc.) and the annotations for the comments. Note that, for a given batch of k comments (such as 3-10 comments), the factor-graph model may include a statistically dependent combination of statistically independent models of the interrelationships between the feature vectors and the annotations for the k comments. Then, annotation engine 120 calculates the annotation probability distribution based on model parameters associated with the factor-graph model, a mapping function that maps from the feature vectors to the annotations, and an indicator function that represents the annotations for the comments in the batches. Furthermore, using the calculated annotation probability distribution, annotation engine 120 may select the one or more subsets based on how informative expected annotations for the comments in the subset are for the one or more classifiers and probabilities of occurrence of the expected annotations based on the predetermined annotation probability distribution. As noted previously, a given classifier may predict how likely the expected annotations are accurate for the comments in a given subset.

By improving the accuracy of the annotations and, thus, the classifiers, system 100 may improve the quality of the content presented to the users of the social network. For example, comments that include spam, which are offensive and/or which do not include appropriate content may be correctly excluded without excluding comments incorrectly deemed to include inappropriate content or while minimizing the number of incorrectly excluded comments. This capability may improve the user experience when using the social network, which may increase customer retention and the use of the social network. In turn, this may allow additional services to be offered to the users and to advertisers, in the form of more effective advertisements (which are presented to the users of the social network), recommendations, employment opportunities, and/or interesting content. Consequently, an annotation technique implemented in system 100 may increase the revenue and profitability enjoyed by a host or provider of the software application and the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 2:
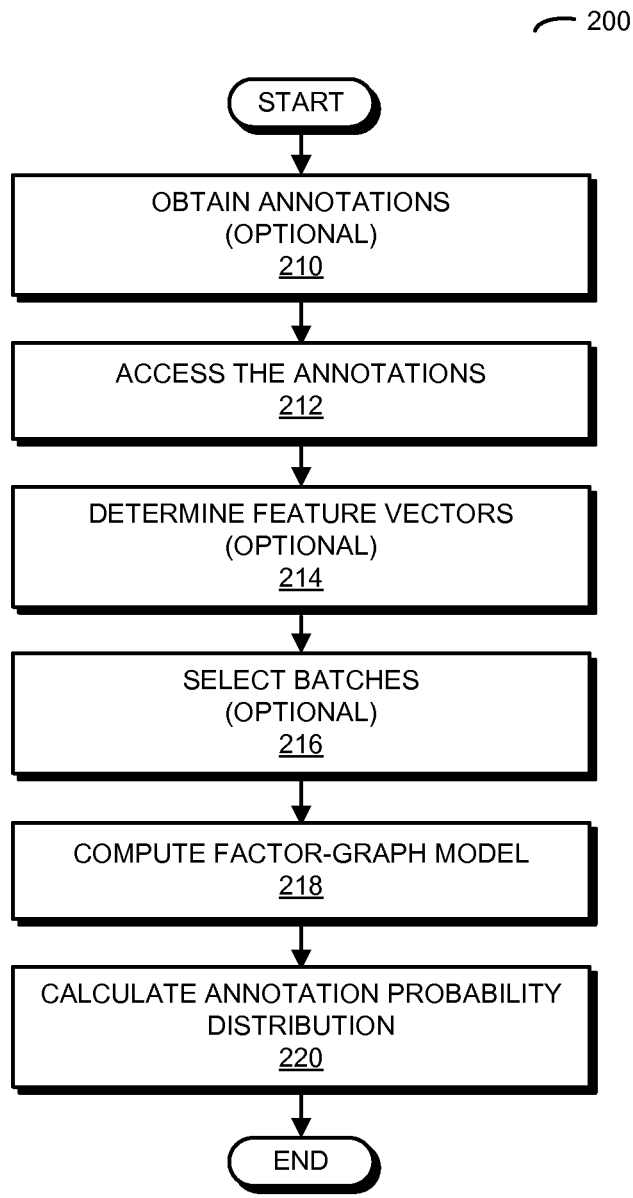
FIG. 2 is a flow chart illustrating a method for calculating an annotation probability distribution of annotations for a set of comments in accordance with an embodiment of the present disclosure.

We now describe embodiments of the annotation technique. FIG. 2 presents a flow chart illustrating a method 200 for calculating an annotation probability distribution of annotations for a set of comments, which may be performed by a computer system (such as system 100 in FIG. 1 or computer system 700 in FIG. 7). During operation, the computer system accesses, at a memory location, the annotations (operation 212) for the set of comments, where the comments are associated with a group of documents. Then, the computer system computes a factor-graph model (operation 218) that represents relationships between feature vectors that represent the comments and the annotations for the comments, where, for a given batch of k comments (such as 3-10 comments), the factor-graph model includes a statistically dependent combination of statistically independent models of the interrelationships between the feature vectors and the annotations for the k comments.

For example, the statistically dependent combination may include a factor function, which includes the indicator function and a first model parameter in the model parameters. Moreover, a given statistically independent model may include a correlation factor function, which includes the mapping function and a second model parameter in the model parameters. This mapping function may include a product of a representation of the annotations and the feature vectors. Note that the computing of the factor-graph model (operation 218) may involve determining the first model parameter and the second model parameter by optimizing a likelihood function that indicates how well the factor-graph model represents the annotations for the set of comments. In some embodiments, the statistically independent models include logistic regression models. However, a wide variety of supervised-learning techniques may be used to train the statistically independent models.

Next, the computer system calculates the annotation probability distribution (operation 220) based on model parameters associated with the factor-graph model, a mapping function that maps from the feature vectors to the annotations, and an indicator function that represents the annotations for the comments in the batches.

In some embodiments, prior to computing the factor-graph model (operation 218), the computer system optionally determines the feature vectors (operation 214) that represent the set of comments. Moreover, the computer system may optionally select the batches (operation 216). For example, the computer system may select the given batch based on how informative expected annotations for the comments are for a classifier and a probability of occurrence of the expected annotations based on the calculated annotation probability distribution, where the classifier predicts how likely the expected annotations are accurate for the comments in the given batch.

Additionally, prior to accessing the annotations (operation 212), the computer system optionally obtains the annotations (operation 210). For example, the computer system may provide a group of documents and the associated set of comments to reviewers, and may receive the annotations from the reviewers.

Figure 3:
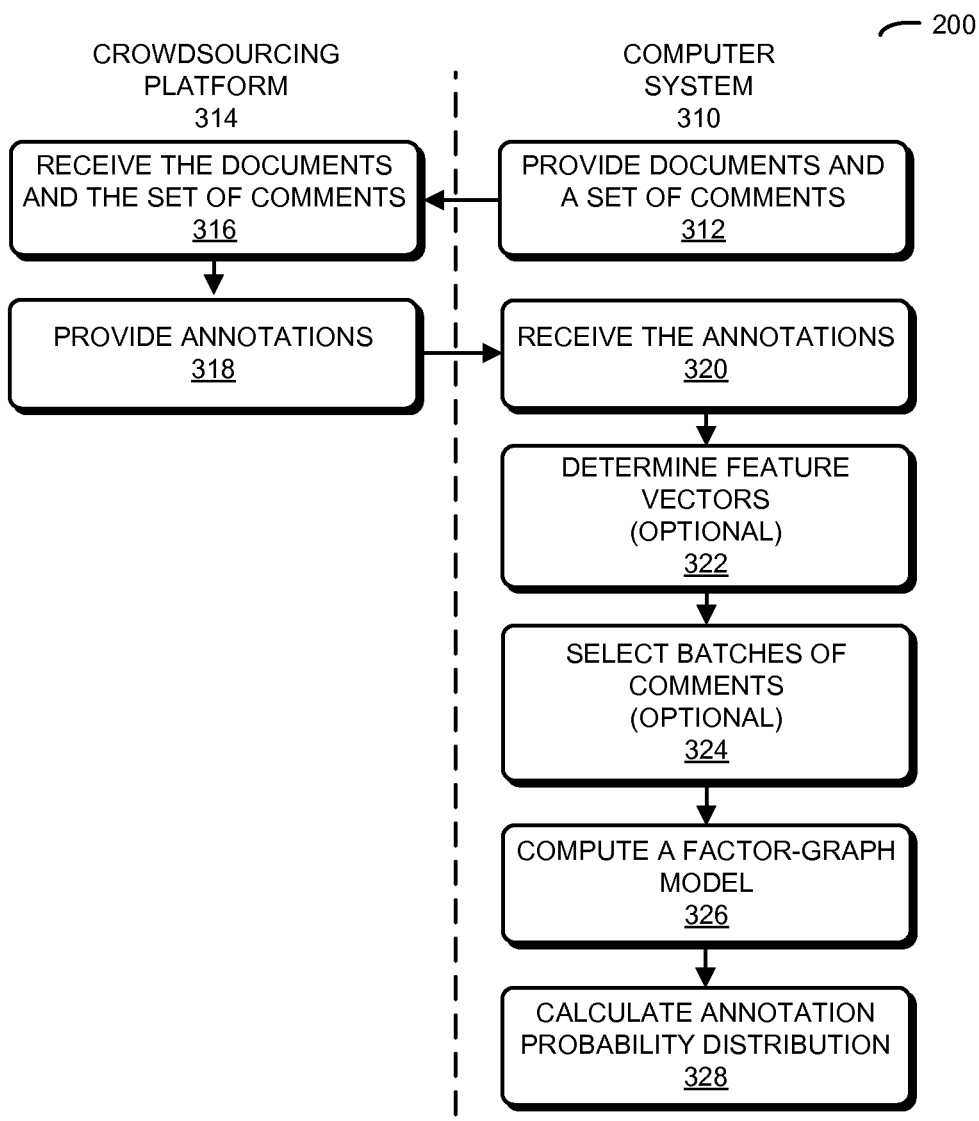
FIG. 3 is a flow chart illustrating the method of FIG. 2 in accordance with an embodiment of the present disclosure.

In an exemplary embodiment, method 200 is implemented using one or more electronic devices and at least one server (and, more generally, a computer system), which communicate through a network, such as a cellular-telephone network and/or the Internet (e.g., using a client-server architecture). This is illustrated in FIG. 3, which presents a flow chart illustrating method 200. During this method, computer system 310 may provide the documents and the set of comments (operation 312) to crowdsourcing platform 314. After receiving the set of comments and the documents (operation 316), reviewers using crowdsourcing platform 314 may provide the annotations (operation 318), which are received (operation 320) by computer system 310.

Then, computer system 310 may optionally determine the feature vectors (operation 322) that represent the set of comments. Moreover, computer system 310 may optionally select the batches of comments (operation 324).

Furthermore, computer system 310 computes the factor-graph model (operation 326)

Next, computer system 310 calculates the annotation probability distribution (operation 328).

In an exemplary embodiment, an active or machine-learning technique is used to learn a distribution of biases (the annotation probability distribution). An intuitive explanation for the annotation bias is that, when an annotator works on a set of comments, the annotator may be reluctant to mark many comments as inappropriate because of a prior belief that inappropriate comments are rare. This 'inertial thinking' can overwhelm the annotation of difficult or uncertain comments. The resulting annotation bias can be characterized or represented using a factor-graph model. This is shown in FIG. 4, which presents a drawing illustrating a factor-graph model 400 of batch annotation. In particular, for a batch of comments (such as five comments) represented by feature vectors $x_i$ there may be associated annotations $y'_j$. In addition, there are correlation factor functions $\phi(x_i, y'_j)$ that model the correlations between the human annotations $y'_j$ and the feature vectors $x_i$. These correlation factor functions may be expressed as $$\exp[\alpha^T f(x_i, y'_j)],$$

where $\alpha$ is a vector of weighting parameters (which is sometimes referred to as the 'second parameter' of the factor-graph model), and $f(x_i, y'_j)$ maps the feature vectors to the annotations. In the binary classification case ($y'_j$ equal to zero or one), $f(x_i, y'_j)$ may be expressed as $x_i y'_j$.

Factor-graph model 400 may also include another factor function $\gamma(y'_j)$, which is defined as $$\exp[\beta^T g(y'_j)],$$

where $\beta$ is a vector of weighting parameters (which is sometimes referred to as the 'first parameter' of the factor-graph model), and $g(y'_j)$ is an indicator function. Each element of the indicator function may correspond to a possible distribution over counts of different labels or annotations within a k-size batch (such as k equal to five). For example, in a binary classification task, $g(y'_j)$ may be a (k+1)-dimension vector, where the $(k_1+1)$-th element is 1 when $|y'_j|$ equals $k_1$ and all other elements are zero. Thus, in the binary classification task, the indicator function may indicate how many of the $y'_j$ are non-zero.

Thus, factor-graph model 400 includes a statistically dependent combination (via $\gamma(y'_j)$) of statistically independent models of the interrelationships between feature vectors $x_i$ and the annotations $y'_j$ for the k comments. In some embodiments, the statistically independent models include logistic regression models. However, a wide variety of supervised-learning techniques may be used to train the statistically independent models. As noted previously, computing factor-graph model 400 may involve determining $\alpha$ and $\beta$ by optimizing a likelihood function that indicates how well factor-graph model 400 represents annotations $y'_j$ for the set of comments. For example, factor-graph model 400 may be trained using a gradient-descent technique applied to a log-likelihood function L expressed as $$\frac{1}{Z} \cdot \prod_{i=1}^{k} \exp(\alpha^T \cdot f(x_i, y'_j)) \cdot \exp(\beta^T \cdot g(y'_j)),$$

where Z is a normalization equal to the sum over all possible permutations of $y'_j$. Note that the annotation probability distribution may be expressed based on factor-graph model 400 as $$q(y_A | x_A, \alpha, \beta) = \frac{1}{Z_A} \cdot \exp\left(\sum_{\alpha} \alpha^T \cdot f(x_\alpha, y'_\alpha) + \beta^T \cdot g(y'_\alpha)\right),$$

where $y_A$ are the annotations, $x_A$ are the comments, and $Z_A$ is a normalization.

As noted previously, the annotation bias specified by the annotation probability distribution may be used to select another subset of comments that can be used to train an improved classifier. This is shown in FIG. 5, which presents a flow chart illustrating a method 500 for selecting a subset of a set of comments associated with a group of documents. Method 500 may be performed by a computer system (such as system 100 in FIG. 1 or computer system 700 in FIG. 7). During operation, the computer system accesses, at memory locations, the set of comments and the (predetermined) annotation probability distribution (operation 510) of annotations for another set of comments associated with another group of documents, where the annotation probability distribution specifies biases in the annotations for the other set of comments. Note that the set of comments may be currently unannotated, and/or at least some of the comments in the set of comments may be different than the comments in the other set of comments. Thus, the set of comments and the other set of comments may, at least in part, be different. Similarly, at least some of the documents in the group of documents may be different than the documents in the other group of documents.

Then, the computer system selects the subset (operation 512) based on how informative expected annotations for the comments in the subset are for the classifier and probabilities of occurrence of the expected annotations based on the predetermined annotation probability distribution, where the classifier predicts how likely the expected annotations are accurate for the comments in the subset. Thus, selecting the subset (operation 512) may exploit the biases in the annotations for the other set of comments.

In some embodiments, selecting the subset (operation 512) involves optimizing an objective function over batches of k comments (such as 3-10 comments) in the set of comments. This objective function may include a difference of how informative batches of annotated comments are to the classifier relative to how informative batches of unannotated comments are to the classifier. Moreover, during the optimizing, the objective function may be weighted by the (predetermined) annotation probability distribution.

Additionally, after selecting the subset (operation 512), the computer system may optionally obtain annotations for the subset (operation 514). For example, the computer system may provide the subset and the associated documents (such as user posts) to reviewers, and may receive the annotations for the subset from the reviewers. Alternatively, the computer system may mask a remainder of the (previously presented) set of comments so that only the subset is presented to reviewers, and then the computer system may receive the annotations for the subset from the reviewers.

Furthermore, the computer system may optionally update the classifier (operation 516) based on the annotations for the subset. For example, the classifier may be dynamically updated as the annotations are obtained (operation 514).

In an exemplary embodiment, method 500 is implemented using one or more electronic devices and at least one server (and, more generally, a computer system), which communicate through a network, such as a cellular-telephone network and/or the Internet (e.g., using a client-server architecture). This is illustrated in FIG. 6, which presents a flow chart illustrating method 500 (FIG. 5). During this method, computer system 310 may access the set of comments and the annotation probability distribution or A.P.D. (operation 610) in memory 612.

Then, computer system 310 selects the subset (operation 614) based on how informative expected annotations for the comments in the subset are for the classifier and probabilities of occurrence of the expected annotations based on the predetermined annotation probability distribution, where the classifier predicts how likely the expected annotations are accurate for the comments in the subset.

Moreover, computer system 310 may provide (operation 616) the subset and the associated documents to crowdsourcing platform 314. After receiving the subset and the associated documents (operation 618), reviewers using crowdsourcing platform 314 may provide the annotations (operation 620), which are received (operation 622) by computer system 310.

Furthermore, computer system 310 may optionally update the classifier (operation 624) based on the annotations for the subset.

In an exemplary embodiment, an active or machine-learning technique is used to select a subset of comments for annotation based on a learned distribution of biases (the annotation probability distribution) so that the classifier may be determined more accuracy and/or more rapidly using the resulting annotations and the subsets of comments. In particular, the selected subset may be more likely to get accurate annotations from reviewers or annotators For a particular user post, a pool of comments is used. Batches of comments (which are subsets of the pool) are scored using an objective function from the supervised-learning technique used to determine the classifier. Note that the objective function includes a difference of how informative batches of annotated comments are to the classifier relative to how informative batches of unannotated comments are to the classifier. Thus, the objective function may be used to determine how 'helpful' a given batch (such as five comments) is for the supervised-learning technique. This process may be repeated for other batches of comments on the same or different user posts, and the comments that are the most informative to the supervised-learning technique that is used to calculate the classifier are selected. For example, an 'informative' comment may be one that is likely to give an expected result when annotated by the reviewers (as determined using the classifier). The selected subset may be the comments that are most likely to be informative (e.g., based on a ranking of the scores) and that are likely to occur based on the factor-graph model.

As an illustration, batches of five comments for a given post may be scored using the objective function. This may be repeated for batches of five comments associated with other posts. Then, the top-50 batches may be selected based on the scores. For example, the subset may be selected by optimizing the objective function over the batches. In particular, the selected batches A* may be selected by maximizing over the batches A in a pool U and maximizing over the annotations $y_A$ the expression $$q(y_A|x_A,\alpha,\beta) \cdot (F(A,y_A) - F(\phi)),$$

where q is a likelihood or weight (i.e., the annotation probability distribution, which is associated with the factor graph as specified by comments $x_A$, and parameters $\alpha$, $\beta$ in the factor graph), $F(A, y_A)$ is the objective function that indicates how information a given batch A is based on a discriminative active or supervised-learning technique, and $F(\phi)$ is the objective function for unlabeled comments. This expression can be optimized using techniques such as simulated annealing or using a Markov chain Monte Carlo technique.

Alternatively, the expression may be relaxed to the continuous case using a max of real values in which each element measures a tendency to use a comment with a label or annotation. In particular, the selected batches S* may be selected by maximizing over $v_0$ and $v_1$ and maximizing over S (the real approximation to discrete batches and annotations) the revised expression $$q(y_A|x_A,\alpha,\beta) \cdot (F(A,y_A) - F(\phi))$$

where S (equal to $[S_0, S_1]$) is a $|u|$-by-2 matrix with the constraints that all of its elements are $0 \leq S_{ij} \leq 1$ and that sum over a column of $$S\left(\sum_{j=1}^{u} S_{ij} = 1\right)$$

is normalized, and that for all batches $v_0 \cdot S_{o,j} + v_1 \cdot S_{1,j} \leq 1$. Note that $v_0$ enumerates the number of inappropriate comments and $v_1$ enumerates the number of appropriate comments in a batch (i.e., $v_0$ and $v_1$ are global non-negative integers in the optimization). Thus, $v_0$ and $v_1$ are related to the number of comments in a batch. For a batch of five comments, there are six possible combinations of $v_0$ and $v_1$: (0,5), (1,4), (2,3), (3,2), (4,1) and (5,0). The revised expression may be optimized by maximizing A and $y_A$ using techniques such as steepest descents or the simplex technique.

In these ways, the annotation technique can improve the accuracy of annotations and classifiers trained based on the annotations. This approach may help ensure that content in the social network (such as recommendations, analysis and, more generally, value-added services) are useful to the users of the social network, as well as advertisers and other potential revenue sources. Consequently, the annotations technique provided herein may improve the social network by increasing user retention, as well as the value of the social network to the users, advertisers, partners, etc.

In some embodiments of methods 200 (FIGS. 2 and 3) and 500 (FIGS. 5 and 6), there may be additional or fewer operations. Moreover, the order of the operations may be changed, and/or two or more operations may be combined into a single operation.

Figure 7:
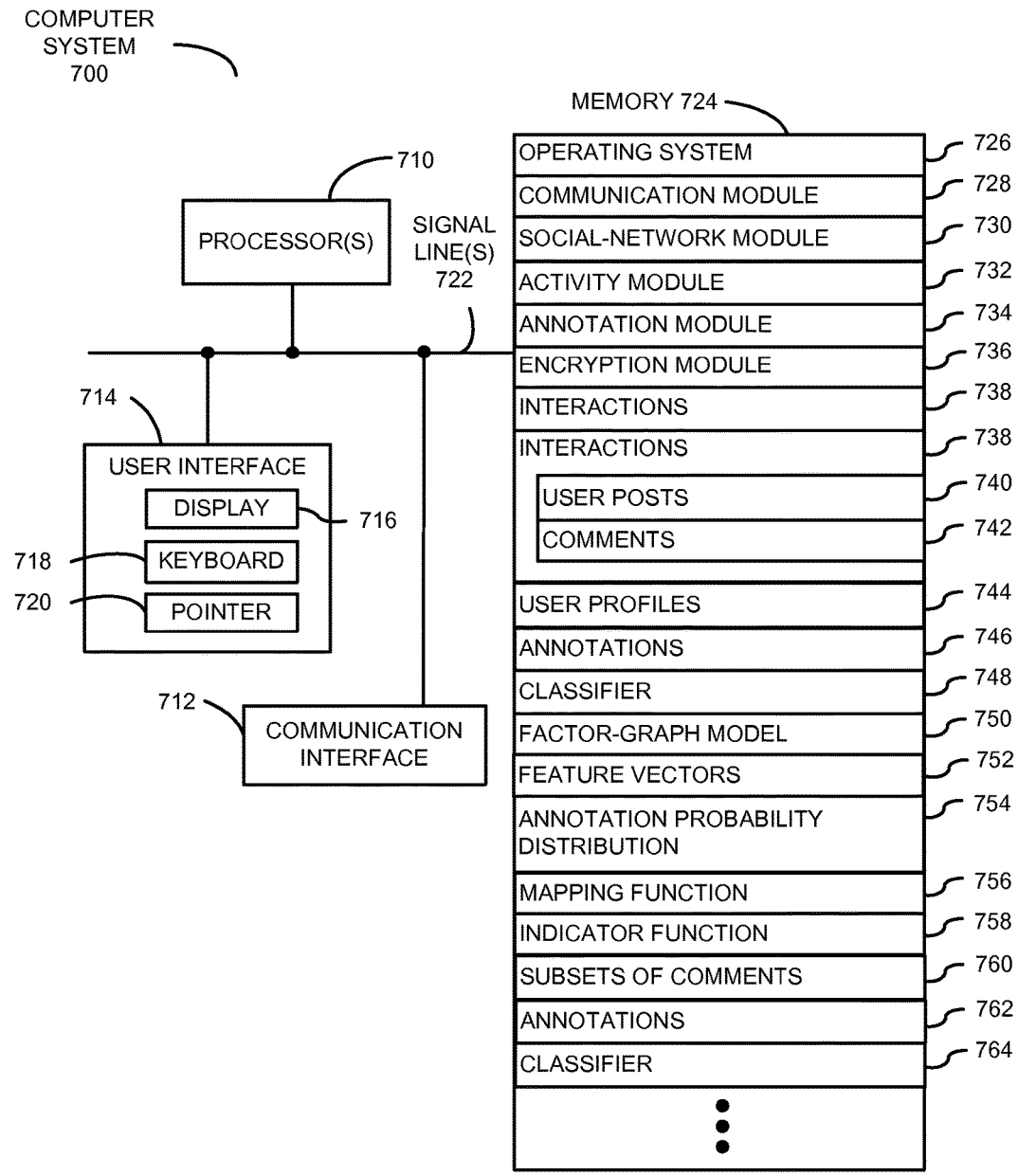
FIG. 7 is a block diagram illustrating a computer system that performs the methods of FIGS. 2, 3, 5 and 6 in accordance with an embodiment of the present disclosure.

We now describe embodiments of a computer system for performing the annotation technique, and its use. FIG. 7 presents a block diagram illustrating a computer system 700 that performs method 200 (FIGS. 2 and 3) and/or 500 (FIGS. 5 and 6), such as system 100 in FIG. 1. Computer system 700 includes one or more processing units or processors 710 (which are sometimes referred to as a 'processing module'), a communication interface 712, a user interface 714, memory 724, and one or more signal lines 722 coupling these components together. Note that the one or more processors 710 may support parallel processing and/or multi-threaded operation, the communication interface 712 may have a persistent communication connection, and the one or more signal lines 722 may constitute a communication bus. Moreover, the user interface 714 may include: a display 716 (such as a touchscreen), a keyboard 718, and/or a pointer 720 (such as a mouse).

Memory 724 in computer system 700 may include volatile memory and/or non-volatile memory. More specifically, memory 724 may include: ROM, RAM, EPROM, EEPROM, flash memory, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more computers and/or servers, including computers and/or servers that are remotely located with respect to computer system 700.

Memory 724 may also include multiple program modules (or sets of instructions), including: social-network module 730 (or a set of instructions), activity module 732 (or a set of instructions), annotation module 734 (or a set of instructions), and/or encryption module 736 (or a set of instructions). Note that one or more of these program modules (or sets of instructions) may constitute a computer-program mechanism.

During operation of computer system 700, social-network module 730 facilitates interactions 738 among users 744 via communication module 728 and communication interface 712. These interactions may be tracked by activity module 732, and may include user posts 740 and associated comments 742. Then annotation module 734 may provide, via communication module 728 and communication interface 712, one or more subsets of comments 742 (and optionally associated user posts 740) to a crowdsourcing platform (and, more generally, a group of annotators or reviewers). In response, annotation module 734 may receive, via communication interface 712 and communication module 728, annotations 746. Annotation module 734 may use the one or more subsets of comments 742, annotations 746 and a supervised-learning technique to train a classifier 748 that predicts how likely the expected annotations are accurate for the comments in the one or more subsets of comments 742.

Next, annotation module 734 may compute a factor-graph model 750 that represents relationships between feature vectors 752 that represent comments in the one or more subsets of comments 742 and annotations 746. Moreover, annotation module 734 may calculate an annotation probability distribution 754 based on model parameters associated with factor-graph model 750, a mapping function 756 that maps from feature vectors 752 to annotations 746, and an indicator function 758 that represents annotations 746 for batches of comments 742.

Furthermore, annotation module 734 may select one or more additional subsets of comments 760 based on how informative expected annotations for the comments in the one or more additional subsets of comments 760 are for a classifier 748 and a probability of occurrence of the expected annotations based on the calculated annotation probability distribution 754.

Additionally, annotation module 734 may provide, via communication module 728 and communication interface 712, the one or more additional subsets of comments 760 (and optionally associated user posts 740) to a crowdsourcing platform (and, more generally, a group of annotators or reviewers). In response, annotation module 734 may receive, via communication interface 712 and communication module 728, annotations 762. Annotation module 734 may use the one or more additional subsets of comments 760, annotations 762 and the supervised-learning technique to train a classifier 764 that predicts how likely the expected annotations are accurate for the comments in the one or more additional subsets of comments 760. Annotation engine 734 may use classifier 764 to filter or modify comments 742 subsequently presented to the users of a social network by social-network module 730.

Because information in computer system 700 may be sensitive in nature, in some embodiments at least some of the data stored in memory 724 and/or at least some of the data communicated using communication module 728 is encrypted using encryption module 736.

Instructions in the various modules in memory 724 may be implemented in a high-level procedural language, an object-oriented programming language, and/or in an assembly or machine language. Note that the programming language may be compiled or interpreted, e.g., configurable or configured, to be executed by the one or more processors.

Although computer system 700 is illustrated as having a number of discrete items, FIG. 7 is intended to be a functional description of the various features that may be present in computer system 700 rather than a structural schematic of the embodiments described herein. In practice, and as recognized by those of ordinary skill in the art, the functions of computer system 700 may be distributed over a large number of servers or computers, with various groups of the servers or computers performing particular subsets of the functions. In some embodiments, some or all of the functionality of computer system 700 is implemented in one or more application-specific integrated circuits (ASICs) and/or one or more digital signal processors (DSPs).

Computer systems (such as computer system 700), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 700 may include fewer components or additional components. Moreover, two or more components may be combined into a single component, and/or a position of one or more components may be changed. In some embodiments, the functionality of system 100 (FIG. 1) and/or computer system 700 may be implemented more in hardware and less in software, or less in hardware and more in software, as is known in the art.

While a social network has been used as an illustration in the preceding embodiments, more generally the annotation technique may be used to improve the accuracy of the annotations for a wide variety of applications or systems that use annotated data. For example, the annotation technique may be used to determine and/or leverage the bias in annotations to improve classifiers used in search engines, data bases, etc. Moreover, the annotation technique may be used in applications where the communication or interactions among different entities (such as people, organizations, etc.) can be described by a social graph. Note that the people may be loosely affiliated with a website (such as viewers or users of the website), and thus may include people who are not formally associated (such as users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the annotation technique may be used to expand the quality of interactions and value-added services among relevant or potentially interested people in a more loosely defined group of people.

Furthermore, while the preceding embodiments used the annotation bias specified by the calculated annotation probability distribution to select the subset (and, thus, to revise the annotations), in other embodiments the annotation probability distribution is used to weight or normalize the annotations when the classifier is determined. For example, the weight for a given annotation may correspond to an inverse of the associated probability in the annotation probability distribution. Thus, instead of exploiting or leveraging the annotation bias, in some embodiments the annotation probability distribution is used to correct for the annotation bias when training the classifier.

Additionally, in some embodiments the annotation technique is used for an arbitrary supervised learning problem (as opposed to only being used in the context of comments on annotations). Thus, the annotation technique may be used to calculate the annotation probability distribution or selecting the subset for annotations (such as classifications) for a group of documents (such as articles, web pages, data structures, data bases, information, etc.).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for calculating an annotation probability distribution of annotations for a set of comments, the method comprising:
   accessing, at a memory location, the annotations for the set of comments, wherein the comments are associated with a group of documents;
   using a computer processor that is coupled to the memory location and programmed to calculate the annotation probability distribution:
   computing a factor-graph model that represents relationships between feature vectors that represent the comments and the annotations for the comments, wherein, for a given batch of k comments, the factor-graph model includes a statistically dependent combination of statistically independent models of the interrelationships between the feature vectors and the annotations for the k comments; and
   calculating the annotation probability distribution based on model parameters associated with the factor-graph model, a mapping function that maps from the feature vectors to the annotations, and an indicator function that represents the annotations for the comments in the batches; and
   using the calculated annotation probability distribution to select one or more subset of the set of comments, wherein the one or more subset of the set of comments are further selected based on an objective function, and wherein the objective function is optimized by maximizing an expression comprising the annotation probability distribution and the objective function.

2. The method of claim 1, wherein:
the statistically dependent combination includes a factor function; and
the factor function includes the indicator function and a first model parameter in the model parameters.

3. The method of claim 2, wherein:
a given statistically independent model includes a correlation factor function; and
the correlation factor function includes the mapping function and a second model parameter in the model parameters.

4. The method of claim 3, wherein the mapping function includes a product of a representation of the annotations and the feature vectors.

5. The method of claim 4, wherein the computing involves determining the first model parameter and the second model parameter by optimizing a likelihood function that indicates how well the factor-graph model represents the annotations for the set of comments.

6. The method of claim 1, wherein the statistically independent models include logistic regression models.

7. The method of claim 1, wherein, prior to computing the factor-graph model, the method further comprises determining the feature vectors that represent the set of comments.

8. The method of claim 1, wherein, prior to computing the factor-graph model, the method further comprises selecting the given batch based on how informative expected annotations for the comments are for a classifier and a probability of occurrence of the expected annotations based on the calculated annotation probability distribution; and
wherein the classifier predicts how likely the expected annotations are accurate for the comments in the given batch.

9. The method of claim 1, wherein
prior to accessing the annotations, the method further comprises obtaining the annotations by:
providing the set of comments to reviewers; and
receiving the annotations from the reviewers.

10. An apparatus, comprising:
one or more processors;
memory; and
a program module, wherein the program module is stored in the memory and, during operation of the apparatus, is executed by the one or more processors to calculate an annotation probability distribution of annotations for a set of comments, the program module including:

instructions for accessing, at a memory location in the memory, the annotations for the set of comments, wherein the comments are associated with a group of documents;

instructions for computing a factor-graph model that represents relationships between feature vectors that represent the comments and the annotations for the comments, wherein, for a given batch of k comments, the factor-graph model includes a statistically dependent combination of statistically independent models of the interrelationships between the feature vectors and the annotations for the k comments;

instructions for calculating the annotation probability distribution based on model parameters associated with the factor-graph model, a mapping function that maps from the feature vectors to the annotations, and an indicator function that represents the annotations for the comments in the batches; and instructions for using the calculated annotation probability distribution to select one or more subset of the set of comments, wherein the one or more subset of the set of comments are further selected based on an objective function, and wherein the objective function is optimized by maximizing an expression comprising the annotation probability distribution and the objective function.

11. The apparatus of claim 10, wherein:
the statistically dependent combination includes a factor function; and
the factor function includes the indicator function and a first model parameter in the model parameters.

12. The apparatus of claim 11, wherein:
a given statistically independent model includes a correlation factor function; and
the correlation factor function includes the mapping function and a second model parameter in the model parameters.

13. The apparatus of claim 12, wherein the mapping function includes a product of a representation of the annotations and the feature vectors.

14. The apparatus of claim 13, wherein the computing involves determining the first model parameter and the second model parameter by optimizing a likelihood function that indicates how well the factor-graph model represents the annotations for the set of comments.

15. The apparatus of claim 10, wherein the statistically independent models include logistic regression models.

16. The apparatus of claim 10, wherein the program module further includes instructions for determining the feature vectors that represent the set of comments prior to computing the factor-graph model.

17. The apparatus of claim 10, wherein the program module further includes instructions for selecting the batches prior to computing the factor-graph model.

18. The apparatus of claim 10, wherein:
the program module further includes instructions for obtaining the annotations prior to accessing the annotations, by:
providing the set of comments to reviewers; and
receiving the annotations from the reviewers.

19. A system, comprising:
a processing module comprising a non-transitory computer readable medium storing instructions that, when executed, cause the system to:
access, at a memory location, annotations for a set of comments, wherein the comments are associated with a group of documents;
compute a factor-graph model that represents relationships between feature vectors that represent the comments and the annotations for the comments, wherein, for a given batch of k comments, the factor-graph model includes a statistically dependent combination of statistically independent models of the interrelationships between the feature vectors and the annotations for the k comments;
calculate an annotation probability distribution based on model parameters associated with the factor-graph model, a mapping function that maps from the feature vectors to the annotations, and an indicator function that represents the annotations for the comments in the batches; and
use the calculated annotation probability distribution to select one or more subset of the set of comments, wherein the one or more subset of the set of comments are further selected based on an objective function, and wherein the objective function is optimized by maximizing an expression comprising the annotation probability distribution and the objective function.

20. The system of claim 19, wherein the mapping function includes a product of a representation of the annotations and the feature vectors.

* * * * *